United States Patent
Katori et al.

(10) Patent No.: US 7,548,751 B2
(45) Date of Patent: Jun. 16, 2009

(54) MOBILE COMMUNICATIONS SYSTEM FOR ASSIGNING A PLURALITY OF FREQUENCIES TO A PLURALITY OF MOBILE TERMINALS

(75) Inventors: Masato Katori, Kawasaki (JP); Makoto Ueno, Kawasaki (JP); Masao Ootsuka, Kawasaki (JP); Tomohiro Tsuda, Kawasaki (JP); Kengo Kawamura, Kawasaki (JP); Motoyuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 793 days.

(21) Appl. No.: 11/009,223

(22) Filed: Dec. 10, 2004

(65) Prior Publication Data

US 2005/0272431 A1 Dec. 8, 2005

(30) Foreign Application Priority Data

Jun. 1, 2004 (JP) .............................. 2004-163793

(51) Int. Cl.
*H04Q 7/20* (2006.01)
(52) U.S. Cl. ........................ 455/443; 455/446; 455/561; 455/453; 370/334
(58) Field of Classification Search ................. 455/446, 455/452.1, 561, 450, 432.1, 436, 440, 438, 455/437, 442, 453, 449, 443; 370/330–335, 370/320, 342
See application file for complete search history.

(56) References Cited

U.S. PATENT DOCUMENTS

| 5,548,835 | A | 8/1996 | Sasaki |
| 6,980,805 | B2 * | 12/2005 | Matsumoto et al. ......... 455/440 |
| 7,174,167 | B2 * | 2/2007 | Otsuka et al. ............... 455/442 |
| 7,233,797 | B2 * | 6/2007 | Kanagawa ................... 455/446 |
| 7,260,398 | B2 * | 8/2007 | Igarashi et al. .............. 455/436 |
| 2003/0137951 | A1 | 7/2003 | Otsuka et al. |
| 2004/0106412 | A1 * | 6/2004 | Laroia et al. ................ 455/448 |
| 2005/0026614 | A1 | 2/2005 | Otsuka et al. |
| 2006/0286983 | A1 | 12/2006 | Otsuka et al. |

FOREIGN PATENT DOCUMENTS

| JP | 59-027636 | 2/1984 |
| JP | 7-162349 A | 6/1995 |
| JP | 10-322760 | 12/1998 |
| JP | 2000-125333 | 4/2000 |
| JP | 2000-224650 | 8/2000 |
| JP | 2002-165256 | 6/2002 |

OTHER PUBLICATIONS

Japanese Office Action - Mailed Dec. 2, 2008 for Japanese patent application No. 2004-163793 (partial English translation provided).

* cited by examiner

*Primary Examiner*—Sujatha Sharma
(74) *Attorney, Agent, or Firm*—Fujitsu Patent Center

(57) ABSTRACT

Adjacent base stations transmit and receive a signal using a plurality of carriers (frequencies), for example, f1 through f3. One base station has the largest transmission power for the carrier f1 and the smallest transmission power for the carrier f3. Another base station has the smallest transmission power for the carrier f1 and the largest transmission power for the carrier f3. Each of the carriers f1 through f3 has a different boundary positions.

16 Claims, 11 Drawing Sheets

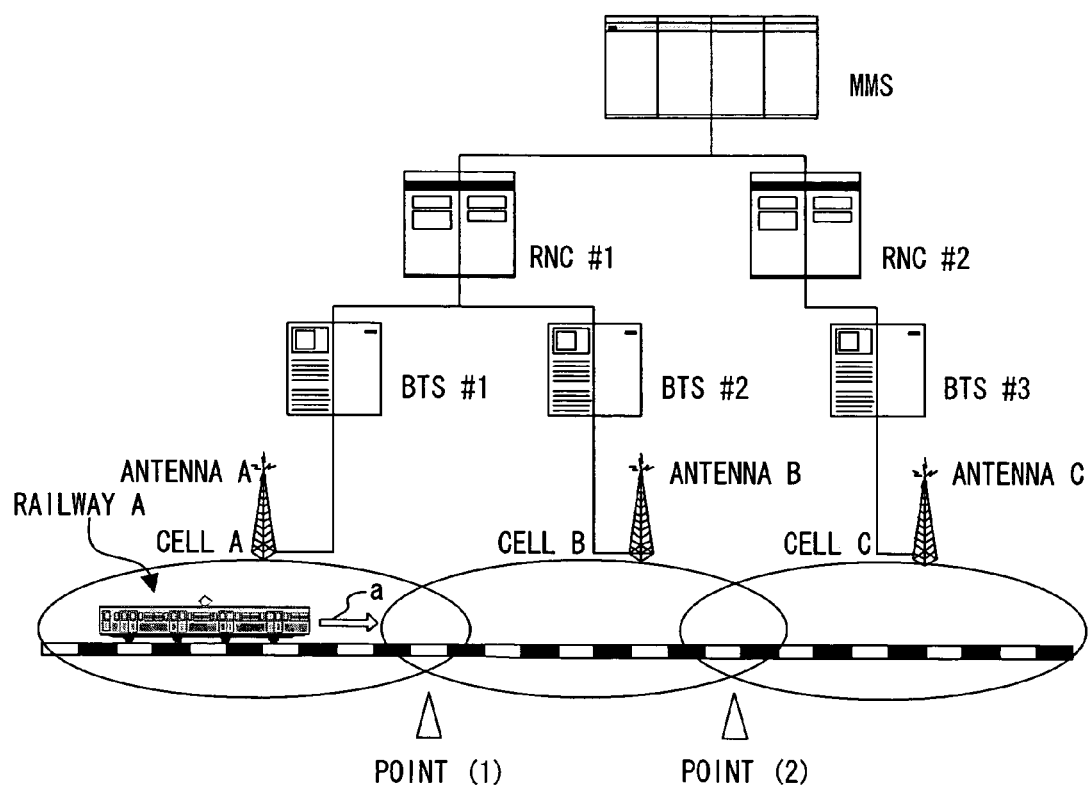
F I G. 1

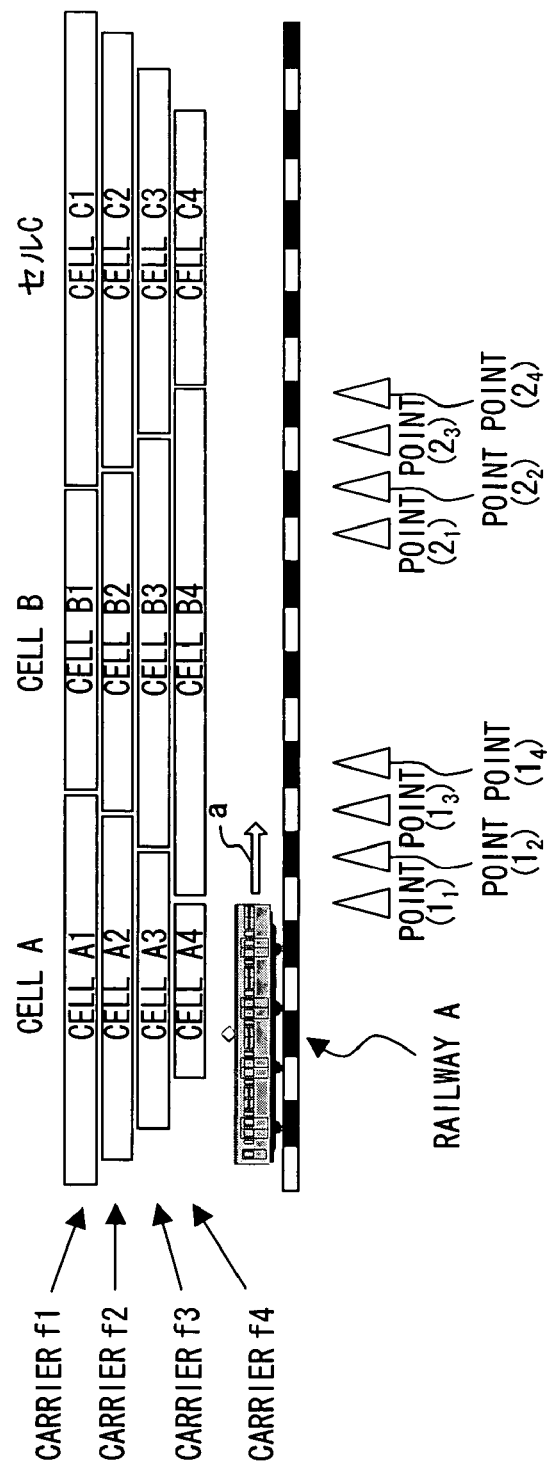
F I G. 4

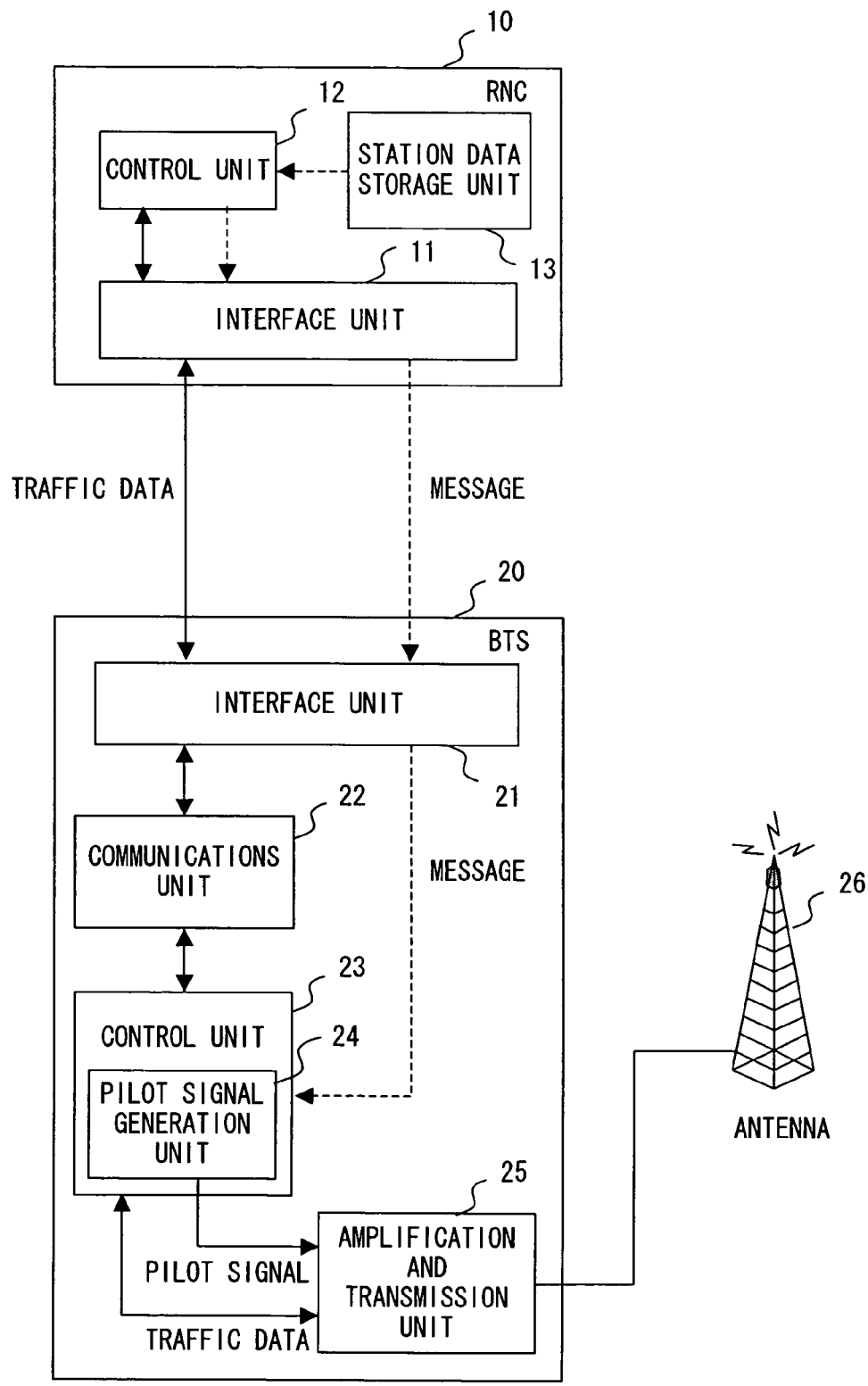
F I G. 5

| TERMINAL INSTANCE ID | CARRIER REARRANGED CELL ID |
|---|---|
| 00001 | 02615 |
| 00002 | 03695 |
| 00003 | 00215 |
| 00004 | 00026 |
| 00005 | 06580 |
| ⋮ | ⋮ |

FIG. 11

MOBILE COMMUNICATIONS SYSTEM FOR ASSIGNING A PLURALITY OF FREQUENCIES TO A PLURALITY OF MOBILE TERMINALS

BACKGROUND OF THE INVENTION

1. Field of the Invention

The present invention relates to a mobile communications system, and more specifically to a mobile system between the cells of mobile terminals. A typical example is a handover process during communications in a W-CDMA mobile communications system.

2. Description of the Related Art

The IMT2000 (W-CDMA) system is one of the mobile communications systems, and includes a plurality of base stations (BTS) forming the respective radio areas, and base station control devices (RNC) which are the upper devices to the plurality of base station devices. A mobile terminal can establish communications over a mobile communications network by setting a radio connection with any BTS (base station). When the CDMA system is used, a plurality of communications channels can be set using a diffusion code. However, a diffusion code is finite, and there is a restriction on the number of channels available to a frequency (carrier) due to the problem of an increasing interference frequency. Therefore, a plurality of frequencies (carriers) are assigned to a BTS, and a mobile terminal performs communications using any of the carriers.

When the mobile terminal during communications travels and reaches the boundary of the BTS, it is necessary to perform a handover to an adjacent BTS. A handover can be a hard handover and a soft handover. In a hard handover, a carrier used after the handover is switched to a carrier of a different frequency. In a soft handover, a carrier used after the handover has the common frequency.

In the above-mentioned CDMA mode mobile communications system, various handover technologies have been disclosed. The conventional technologies are listed below.

First, in the first conventional technology disclosed by the patent literature 1, the traffic among a plurality of carriers is assigned to each carrier depending on the load level in the CDMA mode mobile communications system.

In the second conventional technology disclosed by the patent literature 2, only in the CDMA mode mobile communications system, when a base station configures an area using a plurality of carriers, the radius of a cell of only a predetermined carrier is set to be large enough to contact the carrier of the adjacent base station, and the radii of the cells of the other carriers are set to be small enough not to contact the adjacent base stations, thereby suppressing the reduction of transmission power in a small area or the interference of a transmission signal from an adjacent base station.

The third conventional technology described in the patent literature 3 discloses the handover process performed when a terminal travels from the cell A to the cell B when a cell G is located between a cell A and a cell B, the α sectors of the cell A and the cell G overlap in signal intensity at the same frequency, and the β sectors of the cell G and the cell B overlap in signal intensity at the same frequency.

[Patent Literature 1] Japanese Patent Application Laid-open No. 2000-224650
"Improved Assignment of Channels among Plural Carriers in the Spread Spectrum System"

[Patent Literature 2] Japanese Patent Application Laid-open No. 2000-125333
"CDMA Mode Mobile Communications System"

[Patent Literature 3] Japanese Patent Application Laid-open No. 2002-165256
"Handoff Method and System Therein in the CDMA Mobile Communications"

Each of the above-mentioned conventional technologies contributes to the improvement of the reliability of the communication quality of the CDMA Mode mobile communications system by, for example, enhancing the precision of a handover, but the following problems cannot be solved.

That is, when a number of mobile terminal simultaneously start the respective handovers in an area (cell) under a predetermined BTS, the load of the RNC for performing the process of adding and deleting a radio link temporarily increases with the handovers, thereby raising the possibility of the delay of communications and the occurrence of the disconnection of a call. As a result, the communication quality is considerably degraded.

The above-mentioned simultaneous handovers occur when users of mobile terminals of the number exceeding a predetermined number travel together in transportation means such as a streetcar, a train, a vehicle, a bus, etc. A typical example is a case where a number of users traveling with their mobile terminals by streetcar. But, for example, when the users travel by bus, there can be a case in which a plurality of buses happen to be driven at a certain boundary between cells, or a similar case happens when users travel in vehicles and the cells of their mobile terminals includes a part of a freeway. In another case, when users walk, and pass through the boundary of the cells of the terminals in communications, and when a combination of these cases occurs, handovers can simultaneously arise.

FIG. 1 is an explanatory view showing the problem that occurs when users of mobile terminals travel by streetcar. FIG. 2 is a one-dimensional view of the boundary of carriers shown in FIG. 1.

In FIG. 1, a base station (BTS) #1 has an antenna A, a base station (BTS) #2 has an antenna B, and a base station (BTS) #3 has an antenna C. The base stations transmit signals of a plurality of frequencies (in this example, carriers f1 through f4) via the respective antennas. These antennas A, B, and C are arranged along the passage line of a streetcar.

The BTS#1, #2 are controlled by a radio network control station (RNC)#1, and the BTS#3 is controlled by the RNC#2. As shown in FIG. 1, a streetcar carrying the users equal to or exceeding a predetermined number sequentially passes through the communications area under the control of the antennas A, B, and C in the direction of the arrow a.

In FIG. 1, since a plurality of carriers f1 through f4 assigned by the antenna A are transmitted by constant power, the radius of a cell of each carrier transmitted from the antenna is the same. This holds true with the antennas B and C. Therefore, as shown in FIG. 2, the boundaries between the respective adjacent cells are the same for all carriers. In FIGS. 1 and 2, since each BTS uses a plurality of common carriers, for example, the same 4 carriers (f1 through f4), a soft handoff (using the same frequency before and after a handover) can be used for a handover.

In the situation as shown in FIGS. 1 and 2, handovers are simultaneously performed at points (1) and (2) shown in FIG. 2. However, relating to the point (1) in this case, when communicating users exceeding a predetermined number are traveling in a streetcar driven at a speed higher than a predetermined speed for example, at the point (1), all handover processes (adding and deleting a radio link) on all communicating mobile terminals in the streetcar have to be processed by the respective RNC through the RNC#1 during the time of the passage of the mobile terminals from the time of the passage of the user in the leading position in the streetcar at the point (1) to the time of the passage of the user in the trailing position in the streetcar at the point (1). In this case, for example, if an instance ID to a mobile terminal at the start of communications is simultaneously assigned to each mobile terminal, then the highest load is temporarily applied to the RNC.

Generally, a number of BTSs are connected under the RNC, and it is preferable that processes to each RNC are distributed even when only transfer processes to each RNC are considered. Although the overload status to an RNC increases a risk of a handover, the failure of a handover invites a communication delay and a call disconnection, that is, the degradation of communication quality when mobile terminals are traveling at a high speed as shown in the above-mentioned example.

SUMMARY OF THE INVENTION

The present invention aims at providing a mobile communications system capable of distributing a process load of a network under an environment in which a number of mobile terminals possibly start handovers.

The mobile communications system having a plurality of base stations forming the respective cells adjacent to one another, the plurality of base stations include a transmission unit for transmitting a signal for use in detecting a cell of a mobile terminal at each of a plurality of frequencies. Among the plurality of base stations, the plurality of frequencies have different boundaries of a range reached by the signal.

A handover occurs when a mobile terminal passes the boundary between cells. In the system according to the present invention, the range reached by the signal for use in detecting a cell in the mobile terminal substantially corresponds to a cell, and the boundary depends on the frequency. Therefore, although a number of mobile terminals simultaneously travel, the triggers of handovers can be distributed. A "boundary" refers to a concept including an area of overlapping portions of reached ranges. "Different boundaries" refer to overlapping portions displaced to each other.

In another aspect of the mobile communications system according to the present invention having a plurality of base stations forming the respective cells adjacent to one another, the plurality of base stations include a transmission unit for transmitting a pilot signal at each of the plurality of frequencies. The transmission unit transmits the pilot signal with different transmission power for the plurality of frequencies.

A pilot signal is used by a mobile terminal detecting a cell. The transmission power of the pilot signal depends on the frequency. That is, the radius of a cell depends on the frequency. Therefore, the boundary of a cell depends on the frequency, thereby distributing the trigger of a handover.

In the mobile communications system according to a further aspect of the present invention having a first base station and a second base station forming adjacent cells, the first and second base stations include a transmission unit for transmitting a pilot signal at the respective frequencies. The transmission unit of the first base station includes a first transmission antenna for transmitting a pilot signal at a first frequency, and a second transmission antenna, provided in a position closer to the second base station than the first transmission antenna, for transmitting a pilot signal at a second frequency. The transmission unit of the second base station includes a third transmission antenna for transmitting a pilot signal at the first frequency, and a fourth transmission antenna, provided in the position farther from the first base station than the third transmission antenna, for transmitting a pilot signal at the second frequency.

With the above-mentioned configuration, since the positions of transmission antennas for transmitting a pilot signal depend on the frequency, the boundary position of a cell can be different for each frequency. Thus, as with the above-mentioned aspects of the present invention, the triggers of handovers can be distributed.

Any of the above-mentioned mobile communications systems can further includes: management device for managing a base station accommodating each mobile terminal and the frequency used by each mobile terminal for each of the plurality of mobile terminals in communications; and arrangement device for distributing and assigning the plurality of frequencies to the plurality of mobile terminals. With these devices, the frequencies assigned to a plurality of mobile terminals are distributed, and therefore, the effect of distributing the triggers of handovers can be more conspicuous.

According to the present invention, the trigger of the handover is distributed. For example, by a plurality of mobile terminals in communications loaded onto a streetcar, vehicle, bus, etc., the handover processes are simultaneously performed if the mobile terminals concentrate on the vicinity of the boundary of a cell at the same time. According to the present invention, the handover timing is distributed, and the concentration (temporary increase of interference in radio circuits) of the process load of the device managing the handover process can be suppressed.

BRIEF DESCRIPTION OF THE DRAWINGS

FIG. 1 is an explanatory view showing the problem that occurs when a number of mobile terminals simultaneously travel;

FIG. 4 is a one-dimensional view of the boundary of a carrier according to the first embodiment of the present invention;

FIG. 5 is a block diagram showing the detailed configuration of the common RNC and BTS to each embodiment of the present invention;

FIG. 11 shows an example of a database referred to when a request to add a radio link is transmitted.

DETAILED EXPLANATION OF THE PREFERRED EMBODIMENTS

The embodiments of the present invention are explained below by referring to the attached drawings.

Figure 3:
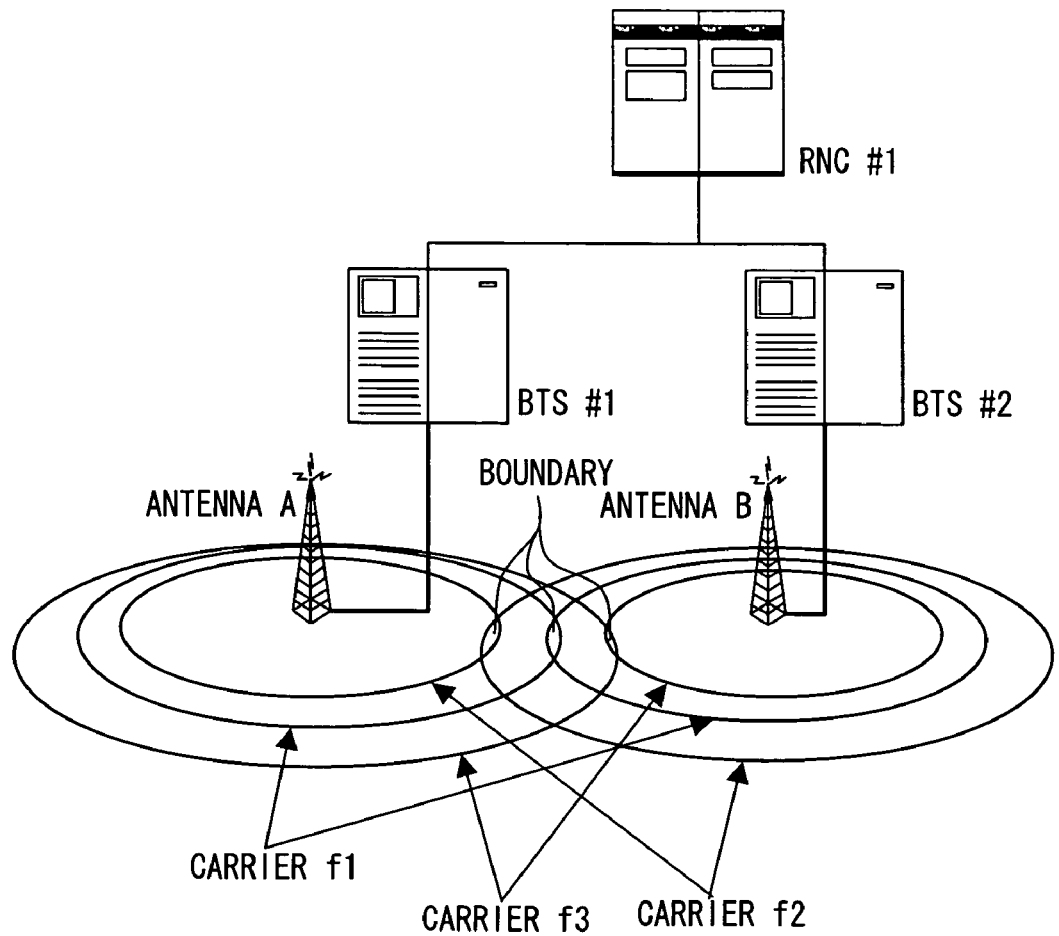
FIG. 3 is an explanatory view of the mobile communications system according to the first embodiment of the present invention.

FIG. 3 is an explanatory view of the mobile communications system according to the first embodiment of the present invention.

As shown in FIG. 3, the mobile communications system according to the present invention comprises a base station (BTS#1, 2), and a radio network control device RNC which is an upper device to the base stations. Although not shown in the attached drawings, the RNC is connected to a further upper device (MMS) for performing routing control together with other RNC. The MMS is connected to a public network. The BTS#1 and 2 are arranged, for example, along the line on which a streetcar is driven (path on which a large number of mobile terminals travel), and include at least the line in the coverage.

The base station (BTS)#1 comprises an antenna A, the base station (BTS)#2 comprises an antenna B. These antennas transmit a signal of a plurality of frequencies (carriers f1 through f3 in this example). At each of the radio frequencies (f1 through f3), a pilot signal, a control signal, and a communications signal such as user data, etc. are transmitted, and a mobile terminal can perform communications over a mobile network by communicating a control signal, a communications signal such as user data, etc. at any radio frequency with a BTS. A pilot signal is shown as an example of a signal which can be used for detecting a cell by a mobile terminal.

It is the characteristic of the present invention that, as shown in FIG. 3, the boundaries between the carriers f1 through f3 transmitted from the antenna A of the BTS#1 and the carriers f1 through f3 transmitted from the antenna B of the BTS#2 differ depending on the carriers. That is, for the carrier f2, the boundary is set on the antenna A side between the antennas A and B. For the carrier f1, the boundary is set in the intermediate position between the antennas A and B. For the carrier f3, the boundary is set on the antenna B side between the antennas A and B.

In the above-mentioned system, it is assumed that a mobile terminal travels from the communications area of the BTS#1 to the communications area of the BTS#2. In this case, the mobile terminal (mobile terminal during communications through the BTS#1) which communicates a pilot signal, a control signal, and user data with the BTS#1 through the carrier f2 monitors the frequency of the carrier f2 during the communications for performing an operation of detecting a pilot signal at a higher reception level with a better reception quality. At this time, since the boundary of the carrier f2 is closer to the antenna A, the pilot signal of the carrier f2 from the antenna B is detected relatively early by monitoring of the frequency of the carrier f2, thereby satisfying the reception condition for a candidate for a handoff destination. For example, the condition is satisfied by a value equal to or larger than a predetermined value of a reception level.

A mobile terminal (in communications through the BTS#1) communicating a pilot signal, a control signal, and user data with the BTS#1 through the carrier f1 monitors the frequency of the carrier f1 during communications to perform an operation of detecting a pilot signal having a higher reception level and improved reception quality. However, the boundary of the carrier f1 is located around the intermediate point between the antennas A and B. Therefore, the pilot signal of the carrier f1 from the antenna B is detected later than the detection by the pilot signal of the carrier f2. As a result, the reception condition for a candidate for a handoff destination about the carrier f1 is satisfied later as compared with the carrier f2. The mobile terminal in communications using the carrier f3 is further later.

As described above, using different boundaries of cells for the respective carriers, the variance in time occurs in determining a candidate for a handoff destination for each carrier although common standards are used in determining a handoff destination. According to the present invention, when a streetcar travels from the coverage of the antenna A to the coverage of the antenna B, the handover processes can be prevented from being simultaneously performed if there is variance of carriers in communications although a number of mobile terminals are communicating in the streetcar.

Described above is the outlined of the first embodiment, but it is explained to more details by referring to FIG. 4 showing the boundary of a carrier as a one-dimensional view with the number of carries increased to 4.

In FIG. 4, a train sequentially passes through the cells A, B, and C. The train of the railway A is loaded with mobile terminals (for example, assume that a user of a mobile terminal carries the mobile terminal and travels in the train). These mobile terminals are assumed to be in the conversation state, the data communications state, etc.

The carriers f1, f2, f3, and f4 are transmitted through a common antenna (base station antenna of the cells A, B, and C) in each cell using different power for each carrier. That is, in the cell A, the power is set to be gradually decreased in order from f1 to f4. In the cell B, contrarily, the power is set to be gradually increased in order from f1 to f4. In the cell C, the power is set to be gradually decreased again in order from f1 to f4.

Figure 2:
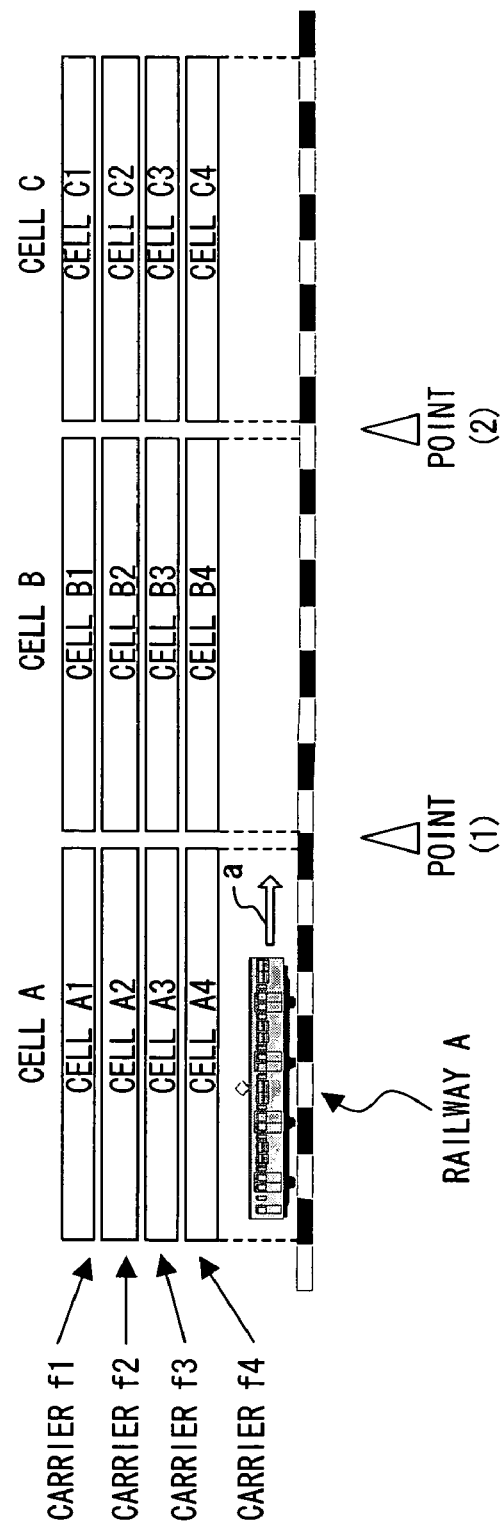
FIG. 2 is a schematic chart showing a view of the boundary of cells shown in FIG. 1.

Therefore, the radius of a cell of each carrier forming a cell corresponding to each antenna is different in f1 through f4, and the boundary with an adjacent cell is different for each carrier. Thus, the trigger of a handover can be distributed. Thus, in the conventional technology shown in FIG. 2, the timing of a train passing the point (1) is the trigger of a handover. In this case, handovers substantially simultaneously occur for a number of mobile terminals in communications in the train. On the other hand, in the system according to the embodiment shown in FIG. 4, the triggers of handovers are distributed to the four points of $(1_1)$, $(1_2)$, $(1_3)$, and $(1_4)$. Practically, first, when the train passes $(1_1)$, a handover occurs for the mobile terminal in communications using the carrier f1. Then, when the train passes $(1_2)$, a handover occurs for the mobile terminal in communications using the carrier f2. Similarly, handovers occur with delay for the mobile terminals in communications using the carriers f3 and f4. Therefore, when the carriers monitored by the mobile terminals are distributed, the timing of performing a handover is displaced for each carrier.

Therefore, the concentration of the process load of the RNC which is an upper device for performing the handover process of gradually switching from the communications through the BTS of the handoff source to the communications through the BTS of the handover destination can be suppressed.

In FIGS. 3 and 4, each BTS uses a plurality of common carriers, for example, the same four carriers (f1 through f4). Therefore, when a handover is performed, a soft handoff (using the same frequency before and after a handover) can be performed.

FIG. 5 is a block diagram showing the detailed configuration of the RNC and the BTS commonly used in each embodiment. In FIG. 5, a radio network control device (RNC) 10 comprises an interface 11, a control unit 12, and a station data storage unit 13 storing station data, and has the function of managing the frequency used by each base station accommodating each of a plurality of mobile terminals and the frequency used by each mobile terminal. A base station (BTS) 20 comprises an interface unit 21, a communications unit 22, a control unit 23, a pilot signal generation unit 24, a amplification and transmission unit 25, and an antenna 26 connected to the amplification and transmission unit 25.

The operation shown in FIG. 5 is explained below. First, the mobile terminal (not shown in FIG. 5) receives a pilot signal transmitted from the antenna 26 of the BTS 20, and measures the power value. If the power value exceeds a threshold, then it is recognized that the mobile terminal has entered the communications zone of the antenna 26. Then, an event notification is transmitted to the BTS in communications, and the RNC receives the event notification through the BTS, and determines whether or not a handover is required. The event notification can include the reception level information about each pilot signal, and the RNC can determine the necessity of the handover by considering the traffic amount, etc. by referring to the reception level information, etc.

The station data stored in the station data storage unit 13 of the RNC 10 stores for each carrier a set value of a power value of a pilot signal transmitted by a lower BTS (BTS 20 and others). The transmission power value is transmitted as a message to a lower base station from the RNC 1, in this case, the BTS 20 (indicated as one-directional broken line in FIG. 5) when the RNC 10 is resumed (at the time of activation or setup), and a cell of the BTS 20 is set by the RNC 10 as a leader. At this time, the RNC 10 reads the transmission power value of a pilot signal from the station data, and notifies the BTS 20 of the value. The BTS 20 to which the transmission power value of the pilot signal is transmitted stores the value to a memory (not shown in FIG. 5), and the pilot signal generation unit 24 in the control unit 23 generates a pilot signal for each carrier by the pilot signal generation unit 24 in the control unit 23 based on the stored value. Then, a generated pilot signal is transmitted by the amplification and transmission unit 25 through the amplifies antenna 26 together with other data, etc.

As the station data stored in the station data storage unit 13 in the RNC 10, a set power value of a pilot signal is set as a different value for each carrier For another lower BTS and adjacent to the BTS 20, a set power value of a pilot signal is different for each carrier, and the relation of the power of the pilot signal can be inverted for each carrier so that boundaries of carrier are set different between carriers as shown in FIG. 4.

In FIG. 5, the traffic data indicated by the bi-directional solid line indicates, for example, shows data communicated among the RNC 10 and the BTS 20 after activation of the RNC 10.

In the explanation according to the first embodiment as described above, the transmission power of all carriers is to be different from each other. In this case, it is expected that the trigger of a handover can be distributed. Otherwise, for example, when the transmission power is set such that the radius of a cell of at least one carrier can be different from the radius of a cell of another carrier, the present embodiment has the effect of reducing the process load required in the handover of the RNC.

Furthermore, depending on the difference in power of each carrier, the boundaries are set different between carriers. As another method, the position of an antenna can also be displaced. That is, for example, for the carriers f1 and f2, the transmission is performed from the first antenna and the second antenna, and the arrangement is made with the displacement in the height direction and the horizontal direction, thereby enabling the boundary to the adjacent base station to be displaced for each carrier, which is described in detail by referring to the second embodiment.

In the explanation above, the boundary of carriers is represented not only with the portion of zones formed by the carriers indicated in a narrow sense, but also the overlapping portion of adjacent areas are broadly defined by according to.

Figure 6:
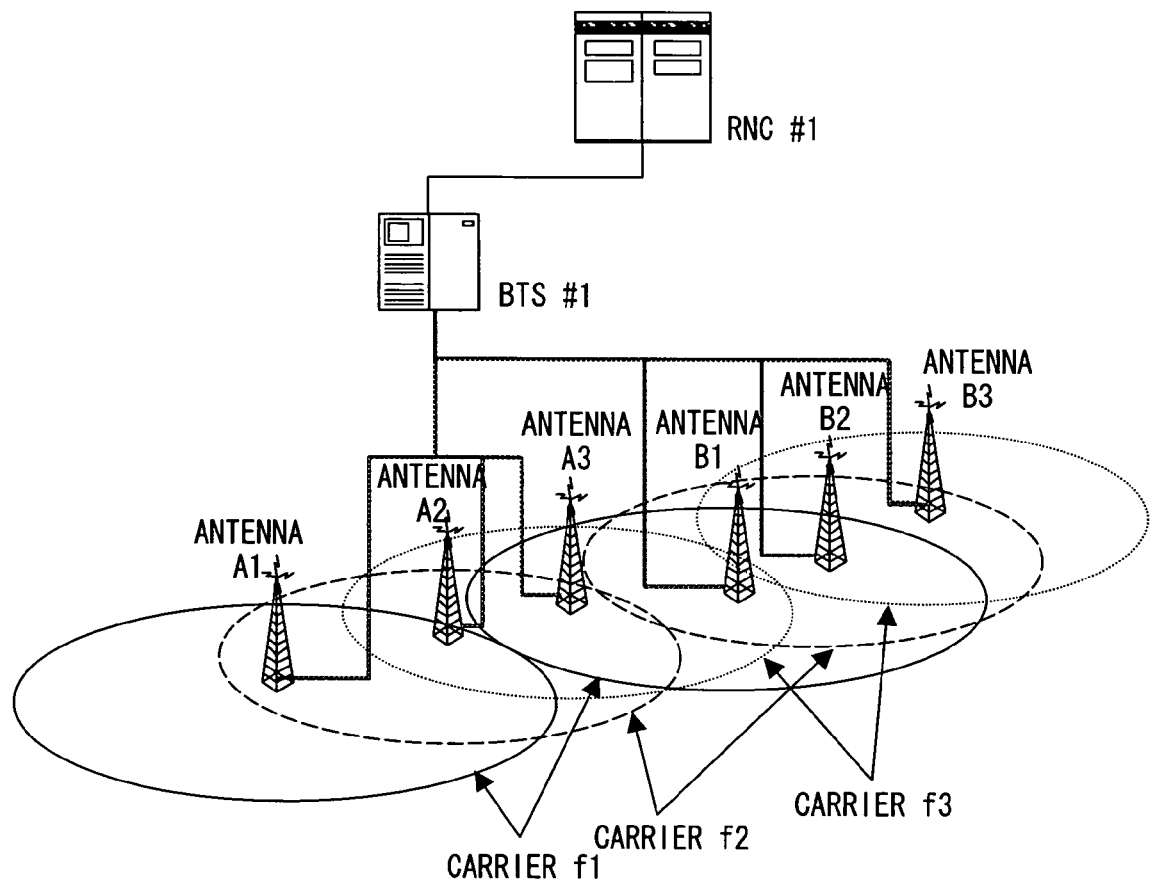
FIG. 6 is an explanatory view of the mobile communications system according to the second embodiment of the present invention.
Figure 7:
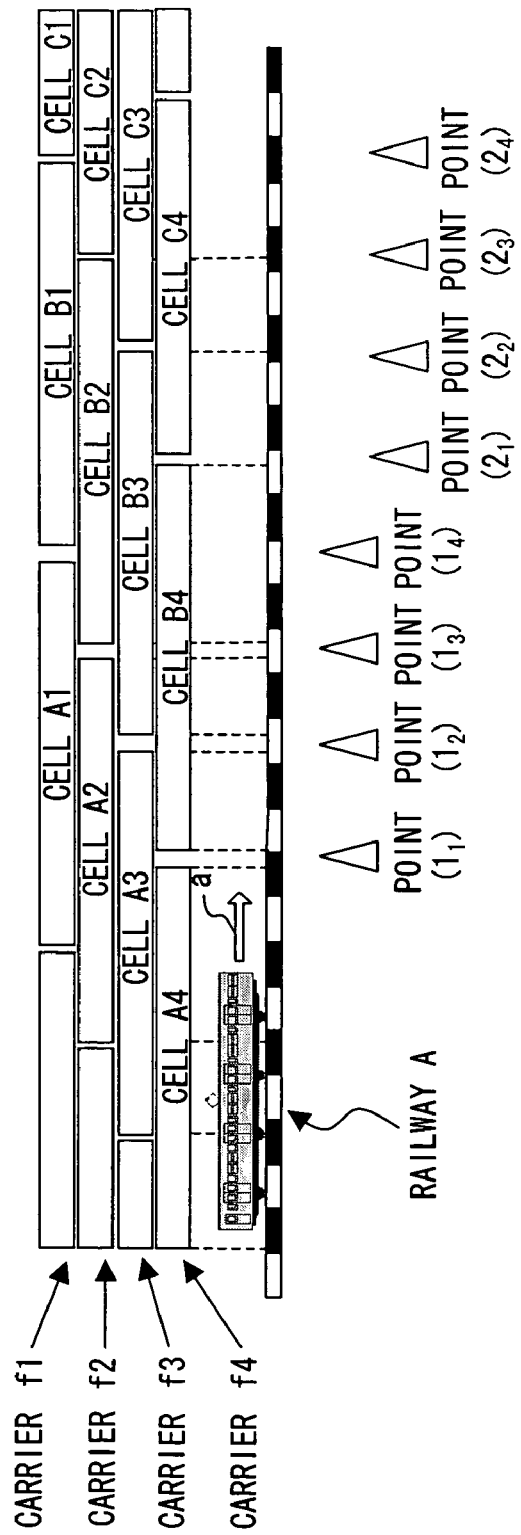
FIG. 7 shows a one-dimensional view of the radius of a cell of the system according to the second embodiment of the present invention.

FIG. 6 shows the mobile communications system according to the second embodiment of the present invention. FIG. 7 shows a one-dimensional system of the radius of a cell of a system according to the second embodiment. In the explanation shown in FIGS. 6 and 7, the overlapping portions in the explanation of the first embodiment are omitted here.

In FIG. 6, the base station (BTS)#1 has six zones A1, A2, A3, B1, B2, and B3 corresponding to the antennas A1, A2, A3, B1, B2, and B3 as its communications zone. One radio frequency (carrier) is assigned as a cell to each zone. These antennas A1, A2, A3, B1, B2, and B3 are arranged along the line a train passes. The BTS#1 having the antennas is controlled by the radio network control station (RNC) #1. As shown in FIG. 7, with a train loaded with users of a mobile terminal in communications exceeding a predetermined number passing on the line in the arrow a direction, the area managed by each antenna is sequentially passed. The BTS#1 can manage the A1, A2, and A3, and the BTS#2 can manage the B1, B2, and B3.

In the conventional technology, a plurality of carriers are transmitted in common from one antenna. However, in the system according to the second embodiment shown in FIG. 6, carriers f1 through f3 are transmitted from different antennas. With this configuration, the transmission position is different from each other in each carrier. Therefore, as in the first embodiment, it is not necessary to transmit a pilot signal of each carrier using a different power from an antenna. That is, although each carrier is transmitted with the same power, for example, the trigger of a handover corresponding to the point (1) is distributed to four points $(1_1)$, $(1_2)$, $(1_3)$, and $(1_4)$ as shown in FIG. 5 in the comparison shown in FIG. 11.

The antenna (for example, A1, B1) for transmission of the same frequency (for example, a carrier f1) is set in a position where a part of range reached by a pilot signal (that is, a cell) transmitted at the frequency overlaps another. The antennas A2 and B2 corresponding to the carrier f2, and the antennas A3 and B3 corresponding to the carrier f3 are similarly arranged. Although not clearly shown in FIG. 6, a similar arrangement is made for the carrier f4.

Thus, when each antenna is set, as shown in FIG. 7, the boundary between the adjacent cells is arranged to allow parallel travel can be performed for each carrier, and the boundary position is different for each carrier.

In the above-mentioned second embodiment, a carrier is transmitted from each antenna, but, for example, two or more carriers, for example, two carriers can be transmitted from each antenna. That is, in the conventional technology, four carriers are transmitted from one antenna. According to the present invention, two carriers can be transmitted from each of two antennas displaced in space. In this case, the trigger of a handover is distributed into two. That is, when a plurality of carriers are assigned to the BTS, a plurality of antennas can be connected to the BTS, and the plurality of antennas can be separately placed. Thus, the trigger of a handover can be distributed, and the process load of the RNC for performing the process can be reduced.

<Rearrangement of Carriers>

Described below is the rearrangement of carriers for obtaining the effect of distributing a handover more preferably performed when it is employed in the first and second embodiment. It is obvious that the rearrangement of carriers can be performed independent of the above-mentioned embodiments.

Figure 8:
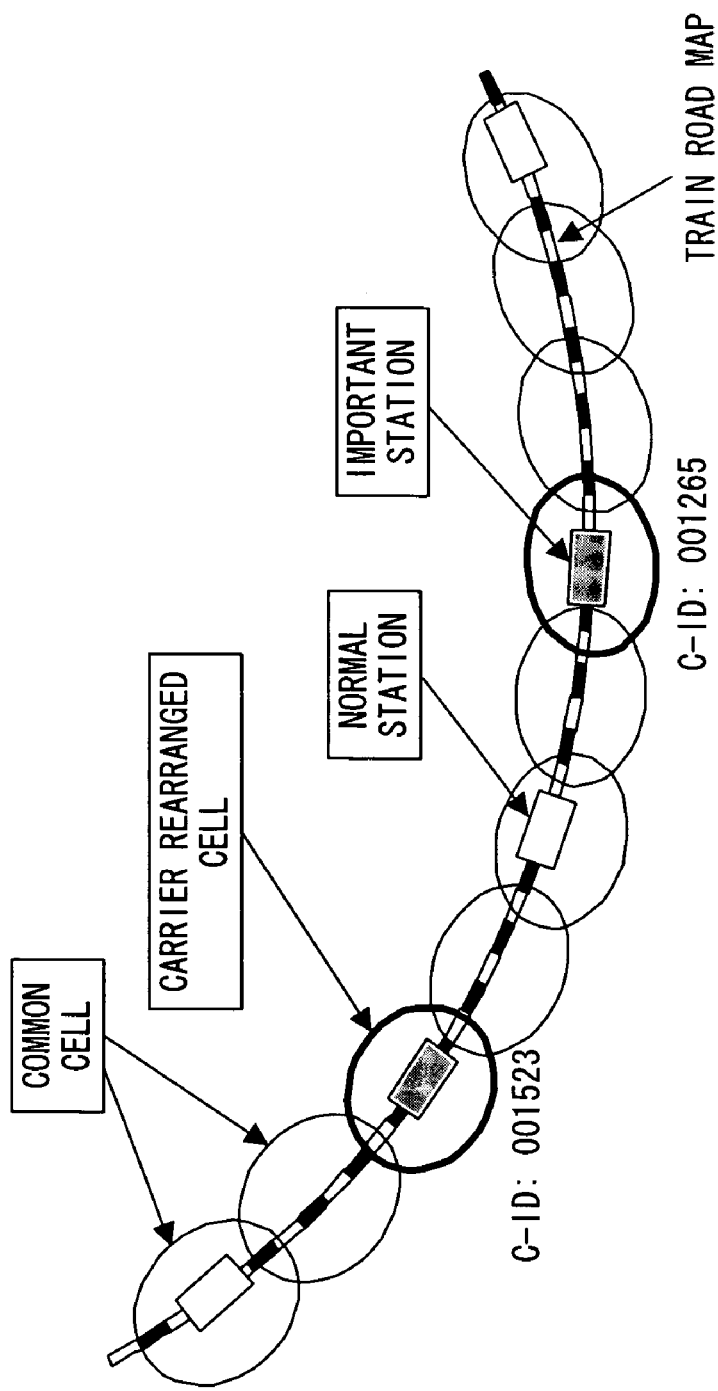
FIG. 8 is an explanatory view of rearranging a carrier.

FIG. 8 shows the rearrangement of carriers. FIG. 8 shows a part of pass-through stations of transportation means for carrying a plurality of mobile terminals, for example, a streetcar. In FIG. 8, at an important station, for example, plural types of a local train, an express train, etc. stop. At a common station, no express train stops but a local train stops. In the present embodiment, a cell covering an important station is referred to as a carrier rearranged cell, and performs the rearrangement of carriers.

That is, in the carrier rearranged cell, when a mobile terminal issues a call, and when it is a handoff destination of a mobile terminal in communications, the carrier available to the terminal is changed (rearrangement of carriers).

Figure 9:
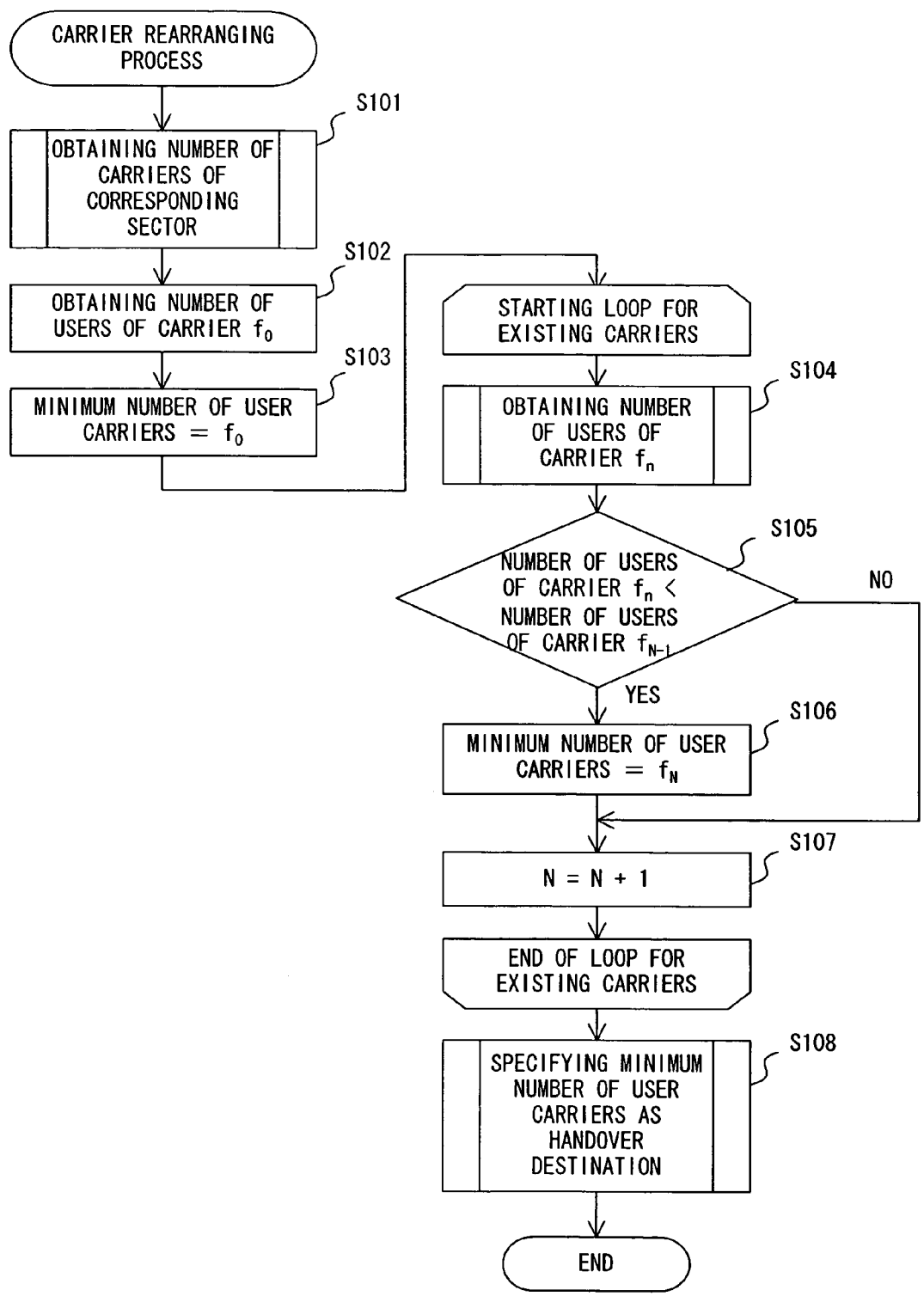
FIG. 9 is a flowchart for a carrier rearranging process performed by an RNC.

FIG. 9 is a flowchart of the carrier rearranging process performed by the RNC. In FIG. 9, first in step S101, the number K of carriers used in the carrier rearranged cell is obtained. Then, in step S102, the number of users communicating using the carrier f0 is obtained. In step S103, the minimum number of user carriers indicating the carriers for which the minimum number of users is entered is set to carrier f0 as the initial value. Then, the loop process is performed in steps 104 through S107.

In step S104, the number of users of the N-th (N=1 to K−1) carrier fN is obtained. In step S105, the number of users of the N-th carrier is compared with the number of users of the (N−1)th carrier. If it is determined as a result of the comparison in step S105 that the number of users of the N-th carrier is smaller than the number of users of the (N−1)th carrier, then control is passed to step S106. Then, the minimum number of user carriers is set as carrier fN, and control is passed to step S107. If it is determined as a result of the comparison in step S105 that the number of users of the Nth carrier is equal to or larger than the number of users of the (N−1)th carrier, then control is passed to step S107, and the loop counter N is incremented.

After performing the loop process in steps S104 through S107 on the existing carriers, the carrier having the carrier number set in the minimum number of user carriers is designated in step S108. Then, the designated carrier is assigned to the newly calling mobile terminal, and a mobile terminal performing a handover.

The operation of determining the carrier having the number of users in communications as described above, can be performed at a predetermined time or a carrier to be assigned can be simply determined at random.

That is, the purpose of the carrier rearranged cell is to distribute the available carriers used by a mobile terminal in communications not to concentrate on one frequency.

Thus, by setting the carrier rearranged cell in the vicinity of an important station, the most part of the hard handover (HHO) occurring between carriers accompanied by the rearrangement can be processed while the streetcar is making a brief stop. Thereby the risk of the degradation of communication quality such as a call disconnection accompanied with the above-mentioned HHO can be reduced.

A user not on transportation means, for example, a user living near an important station is separated from a user entering a rearranged cell as a result of the travel by the transportation means, and a user not on the transportation means can be kept away from the rearranging process shown in FIG. 9. This method is explained below.

Figure 10:
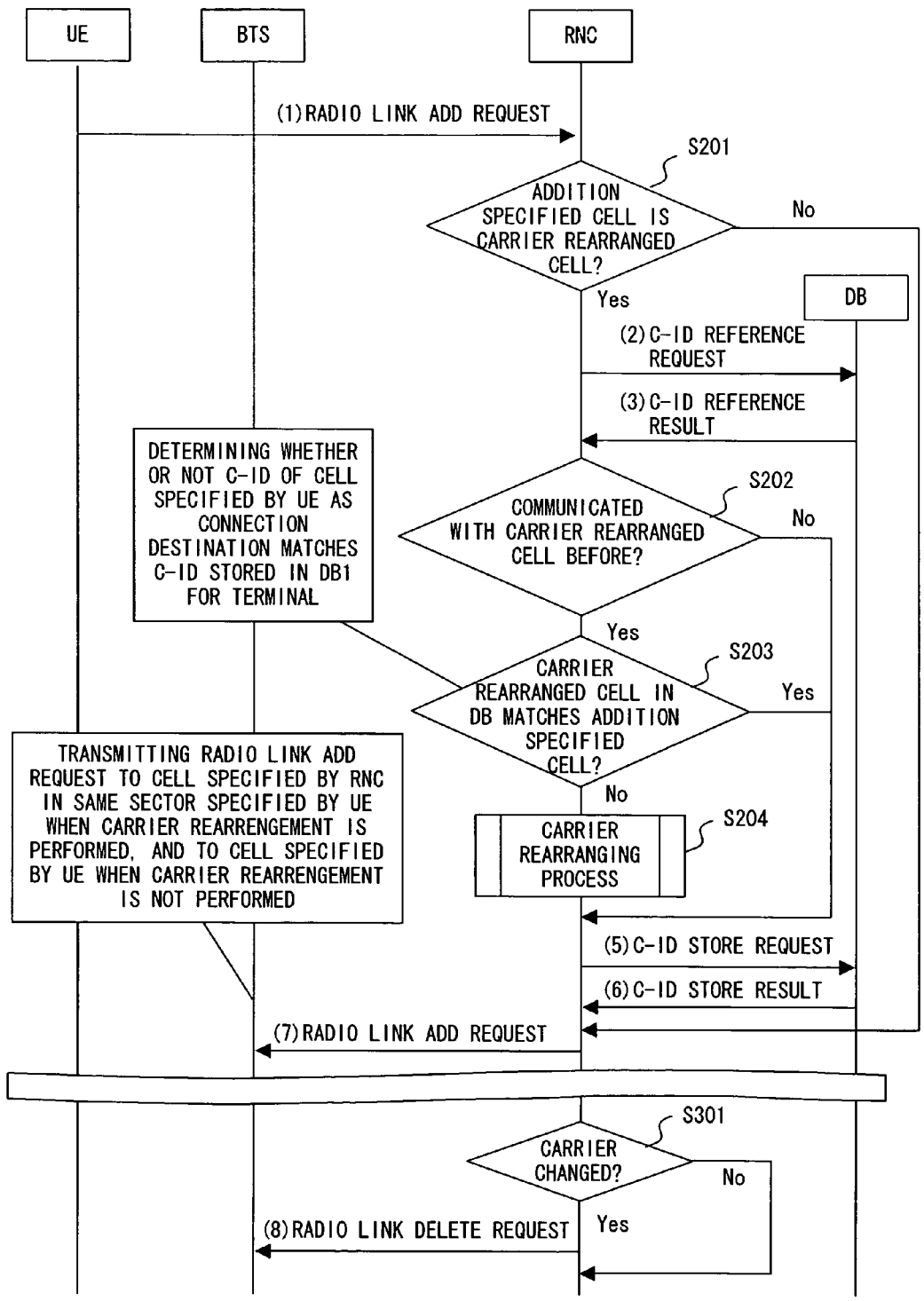
FIG. 10 shows the sequence of the processes performed among the mobile terminal (UE), the base station (BTS), the wireless network control station (RNC)

FIG. 10 shows the sequence of the processes among the mobile terminal (UE), the base station (BTS), and the radio network control station (RNC). In the process sequence, when a radio link is requested in the rearranged cells, and when the mobile terminal which has issued the request is not assumed to be traveling on transportation means such as a train, the above-mentioned rearranging process is skipped.

In FIG. 10, when a radio link add request (1) including a call request and an event notification, etc. is transmitted from the mobile terminal (UE), the radio network control station (RNC) determines according to the radio link add request (call request, signal to be a trigger of a handover) whether or not the cell for which a radio link is to be newly set (referred to as a specified cell to) is a carrier rearranged cell. The RNC can determine which cell is a carrier rearranged cell by referring to the rearrangement cell definition table (not shown in the attached drawings) in which each cell is associated with a rearranged cell flag set ON or OFF.

In step S201, if it is determined that a specified cell to be newly set with a radio link is not a carrier rearranged cell, then the RNC instructs the base station (BTS) to connect a radio link to form a radio link to a mobile terminal without performing the subsequent processes in steps S202 through S204. On the other hand, if it is determined that a specified cell is a carrier rearranged cell, then the RNC assigns a cell ID reference request (2) to the accessible database DB, and a cell ID reference result (3) is returned.

FIG. 11 shows an example of data stored in the database DB. In FIG. 11, the database DB is a table storing a terminal ID which is an ID of a mobile terminal in communications associated with a carrier rearranged cell ID corresponding to the carrier rearranged cell. A carrier rearranged cell ID refers to a carrier rearranged cell to which a mobile terminal has established radio link in previous time.

As described above, upon receipt of a radio link add request (1) from a mobile terminal, the RNC refers to the database DB. At this time, the "terminal instance ID" matching the terminal ID of the mobile terminal which has issued the radio link add request (1) is searched for. The information indicating whether or not there is a matching ID is passed to the RNC. If a matching terminal instance ID has been detected, then the "carrier rearranged cell ID" corresponding to the detected ID is also transmitted to the RNC.

Back in FIG. 10, upon receipt of the reference result (3) from the table shown in FIG. 11, the RNC skips the subsequent steps S203 and S204 if the reference result (3) is "No" in step S202, that is, if no radio link has been formed in the carrier rearranged cell in the communications previously. Then, the RNC issues to the database DB a store request (5) to add a terminal ID about the mobile terminal and an ID for identification of a carrier rearranged cell. Then, the store result (6) indicating whether or not the storage of data relating to the store request (5) has been successfully completed is returned from the database DB to the RNC.

If the determination result in step S202 is "Yes", that is, if communications have ever been established in the carrier rearranged cell with a radio link formed, then it is determined in step S203 whether or not the current carrier rearranged cell matches the previous carrier rearranged cell stored in database DB.

If the determination result in step S203 is "Yes", then step S204 is skipped, and control is passed to the processes (5) and (6) above. The step S204 is skipped because, in this case, the user of the mobile terminal from which a radio link request has been issued is not in the transportation means such as a train, etc., but is assumed to be only traveling around the boundary of the carrier rearranged cell on foot and so on. Therefore, in this case, carriers are not rearranged, but a radio link is normally formed.

If it is determined in step S203, that communications have been performed in the same rearranged cell in a predetermined period, step S204 can be skipped. A mobile terminal which has performed communications in the same rearranged cell in a predetermined period has not passed the rearranged cell in a train, etc., but is assumed to be constantly located near the rearranged cell.

If the determination result in step S203 is "No", then the carrier rearranging process in step S204 is performed. The details are explained by referring to the flowchart in FIG. 9. After performing the carrier rearranging process, control is passed to the processes (5) and (6).

If it is determined in step S201 that the additional specified cell is a carrier rearranged cell, the radio link add request (7) is issued from the RNC to the BTS after performing the processes (5) and (6). In this case, when the rearranging process in step S204 is performed, a radio link add request is transmitted to the carrier (cell) specified by the RNC. If the rearranging process in step S204 is not performed, the radio link add request (7) is returned to the cell specified by the mobile terminal as described above.

At the lower portion shown in FIG. 10, the process between the RNC and the BTS associated with the radio link delete request is described. In this case, it is determined in step S301 whether or not the carrier has been changed. If YES, the RNC transmits the radio link add request (8) to the BTS.

The process in each step shown in FIG. 10 can be realized by software as the function, for example, in the control unit shown in FIG. 5. In the explanation shown in FIG. 10, only the carrier rearranged cell is referred to, and the cell in communications in the previous time is stored in the database, but all cells can be stored with the cells in the previous communications associated with the mobile terminal.

As explained above, according to the present invention, a cell boundary is variably set to each carrier, but the available method is not limited to that described by referring to the first and second embodiments, but it is obvious that various methods can be used.

What is claimed is:

1. A mobile communications system having a plurality of base stations forming respective cells adjacent to one another, the plurality of base stations comprising
   a transmission unit transmitting a signal for use in detecting a cell in a mobile terminal at each of a plurality of frequencies; and
   a management device managing a base station accommodating each mobile terminal and a frequency used by each mobile terminal for each of a plurality of mobile terminals in communications, said management device also distributing and assigning the plurality of frequencies to the plurality of mobile terminals;
   wherein among the plurality of base stations, the plurality of frequencies have different boundaries of a range reached by the signal; and
   wherein said management device assigns a frequency which is assigned to a smallest number of mobile terminals in a predetermined base station to a mobile terminal which transmits a connection request to the predetermined base station.

2. The system according to claim 1, wherein for a mobile terminal communicating in the predetermined base station in a past predetermined period, said arrangement device performs a soft handoff when a handover is performed from an adjacent base station to the predetermined base station.

3. A mobile communications system having a plurality of base stations forming respective cells adjacent to one another, the plurality of base stations comprising
   a transmission unit transmitting a pilot signal at each of the plurality of frequencies;
   a management device managing a base station accommodating each mobile terminal and a frequency used by each mobile terminal for each of a plurality of mobile terminals in communications, said management device also distributing and assigning the plurality of frequencies to the plurality of mobile terminals;
   wherein said transmission unit transmits the pilot signal with different transmission power for the plurality of frequencies; and
   wherein said management device assigns a frequency which is assigned to a smallest number of mobile terminals in a predetermined base station to a mobile terminal which transmits a connection request to the predetermined base station.

4. The system according to claim 3,
   wherein:
   said transmission unit of a first base station of the plurality of base stations transmits a pilot signal transmitted at a first frequency with power larger than a pilot signal transmitted at a second frequency; and
   said transmission unit of a second base station of the plurality of base stations transmits a pilot signal transmitted at the first frequency with power smaller than a pilot signal transmitted at the second frequency.

5. The system according to claim 3, wherein for a mobile terminal communicating in the predetermined base station in a past predetermined period, said arrangement device performs a soft handoff when a handover is performed from an adjacent base station to the predetermined base station.

6. A mobile communications system having a first base station and a second base station forming adjacent cells, the first and second base stations comprising
   a transmission unit transmitting a pilot signal at respective frequencies,
   wherein said transmission unit of the first base station comprises a first transmission antenna for transmitting a pilot signal at a first frequency, and a second transmission antenna, provided in a position closer to the second base station than the first transmission antenna, for transmitting a pilot signal at a second frequency, and
   said transmission unit of the second base station comprises a third transmission antenna for transmitting a pilot signal at the first frequency, and a fourth transmission antenna, provided in a position farther from the first base station than the third transmission antenna, for transmitting a pilot signal at the second base frequency.

7. The mobile communications system of claim 6, further comprising:
   a management device managing one of the first and second base stations accommodating each mobile terminal and a frequency used by each mobile terminal for each of a plurality of mobile terminals in communications, said management device associated with at least one of the first and second base stations for distributing and assigning the plurality of frequencies to the plurality of mobile terminals;
   wherein said transmission unit transmits the pilot signal with different transmission power for the plurality of frequencies, and wherein said arrangement device assigns a frequency which is assigned to a smallest number of mobile terminals in a predetermined station to a mobile terminal which transmits a connection request to the predetermined base station.

8. A cell setting method for use with a mobile communications system having a plurality of base stations forming cells adjacent one another,
    wherein when a signal used in detecting a cell in a mobile terminal is transmitted using a plurality of frequencies from each of the plurality of base stations, a boundary of a range reached by the signal depends on each of the plurality of frequencies among the plurality of base stations, and
    wherein a frequency assigned to a smallest number of mobile terminals in a predetermined base station is assigned to a mobile terminal which transmits a connection request to the predetermined base station.

9. A base station for use in a mobile communications system having a plurality of base stations forming cells adjacent to one another, comprising:
    a storage unit storing transmission power value for each of frequencies for transmission of a pilot signal; and
    a transmission unit transmitting the pilot signal with a transmission power value stored in said storage unit;
    wherein a transmission power value of at least one frequency of the plurality of frequencies stored in said storage unit is different from a transmission power value of another frequency, and wherein said transmission power value of the at least one frequency stored in said storage unit of the base station is different from a transmission power value of the same frequency stored in a storage unit of an adjacent base station; and
    each transmission power value is a value with which each cell having the plurality of frequencies generates a boundary with a cell of a frequency corresponding to an adjacent base station.

10. The base station of the mobile communications system according to claim 9, wherein the transmission power values of the plurality of frequencies are different from each other.

11. The base station of claim 9, wherein the mobile communications system further comprising:
    a management device managing a base station accommodating each mobile terminal and a frequency used by each mobile terminal for each of a plurality of mobile terminals in communications, the management device also distributing and assigning the plurality of frequencies to the plurality of mobile terminals;
    wherein said transmission unit transmits the pilot signal with different transmission power for the plurality of frequencies, and wherein said management device assigns a frequency which is assigned to a smallest number of mobile terminals in a predetermined base station to a mobile terminal which transmits a connection request to the predetermined base station.

12. A base station of a mobile communications system having a plurality of base stations forming adjacent cells, comprising
    a plurality of transmission antennas to which different frequencies are assigned for transmission of a pilot signal;
    wherein said plurality of transmission antennas are arranged in different positions so that a first range reached by the pilot signal at each frequency forms a boundary with a second range reached by a pilot signal at the same frequency of an adjacent base station, and wherein the first and second ranges are different.

13. The base station of the mobile communications system according to claim 12, wherein an electric wave at a frequency is transmitted from each of the transmission antennas.

14. The base station of claim 12, wherein the mobile communications system further comprising:
    a management device managing a base station accommodating each mobile terminal and a frequency used by each mobile terminal for each of a plurality of mobile terminals in communications, said management device also distributing and assigning the plurality of frequencies to the plurality of mobile terminals;
    wherein said transmission unit transmits the pilot signal with different transmission power for the plurality of frequencies; and
    wherein said management device assigns a frequency which is assigned to a smallest number of mobile terminals in a predetermined base station to a mobile terminal which transmits a connection request to the predetermined base station.

15. A radio network control device for controlling a first base station and a second base station forming adjacent cells in the mobile communications system, comprising:
    a management device managing a transmission power value of each of a plurality of frequencies for transmission of a pilot signal from the first base station, and managing a transmission power value of each of a plurality of frequencies for transmission of a pilot signal from the second base station; and
    a notification unit notifying the first base station and the second base station of a transmission power value managed by said management unit,
    wherein a frequency assigned to a smallest number of mobile terminals in a predetermined base station is assigned to a mobile terminal which transmits a connection request to the predetermined base station; and
    wherein the transmission power values for respective frequencies for transmission of a pilot signal from the first base station are different from one another, the transmission power values for respective frequencies for transmission of a pilot signal from the second base station are different from one another, and a first range reached by a pilot signal transmitted from the first base station and a second range reached by a pilot signal transmitted from the second base station form a boundary for each corresponding frequency.

16. The radio network control device of claim 15, wherein the first and second ranges reached by the pilot signals of the first and second base stations are different.

* * * * *